US008571722B2

(12) United States Patent
Samples et al.

(10) Patent No.: US 8,571,722 B2
(45) Date of Patent: Oct. 29, 2013

(54) METHOD FOR SAFELY PARKING VEHICLE NEAR OBSTACLES

(75) Inventors: Michael Edward Samples, Ann Arbor, MI (US); Michael Robert James, Northville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 572 days.

(21) Appl. No.: 12/910,581

(22) Filed: Oct. 22, 2010

(65) Prior Publication Data

US 2012/0101654 A1 Apr. 26, 2012

(51) Int. Cl.
*G05D 1/00* (2006.01)

(52) U.S. Cl.
USPC .................................... 701/1; 701/25; 701/23

(58) Field of Classification Search
USPC ...................... 703/1; 701/25, 23, 532, 411, 1; 725/105; 382/104; 340/988, 990
See application file for complete search history.

(56) References Cited

U.S. PATENT DOCUMENTS 5,696,674 A 12/1997 Trovato et al.
5,870,303 A 2/1999 Trovato et al.
6,415,226 B1 * 7/2002 Kozak ........................... 701/411
6,728,607 B1 4/2004 Anderson
7,206,677 B2 4/2007 Hulden
7,447,593 B2 11/2008 Estkowski et al.
7,660,649 B1 2/2010 Hope et al.
2002/0196975 A1 12/2002 Cahill
2003/0122687 A1 7/2003 Trajkovic et al.
2003/0210806 A1 * 11/2003 YoichiShintani et al. .... 382/104
2003/0212567 A1 * 11/2003 Shintani et al. ................... 705/1
2005/0004753 A1 * 1/2005 Weiland et al. ............... 701/208
2006/0095171 A1 * 5/2006 Whittaker et al. .............. 701/25
2006/0161335 A1 7/2006 Beinhaker
2007/0188349 A1 8/2007 Staniszewski
2008/0077294 A1 3/2008 Danz et al.
2008/0208778 A1 8/2008 Sayyar-Rodsari et al.
2009/0043462 A1 2/2009 Stratton et al.
2009/0149990 A1 6/2009 Myeong et al.
2009/0171567 A1 7/2009 Morimoto et al.
2010/0017115 A1 1/2010 Gautama
2010/0023251 A1 1/2010 Gale et al.
2010/0312527 A1 * 12/2010 Weiland et al. ................... 703/1

OTHER PUBLICATIONS

International Search Report issued Dec. 22, 2011 in corresponding PCT/US11/47153.
U.S. Appl. No. 12/471,079, filed May 22, 2009, Dolgov et al.

* cited by examiner

*Primary Examiner* — Behrang Badii
(74) *Attorney, Agent, or Firm* — Oblon, Spivak, McClelland, Maier & Neustadt, L.L.P.

(57) ABSTRACT

Method, storage medium and system of optimizing a destination for a vehicle by obtaining a map corresponding to a desired destination of the vehicle and identifying objectives of the map based on multiple parameters including collision avoidance, driver time, legal constraints and social consensus. A cost function is constructed to determine an optimal destination based on a proximity to the desired destination and the identified objectives, and an optimal destination is identified by minimizing a value of the cost function.

20 Claims, 6 Drawing Sheets

METHOD FOR SAFELY PARKING VEHICLE NEAR OBSTACLES

BACKGROUND

1. Field of Disclosure

This disclosure relates generally to vehicle parking and vehicle parking near obstacles.

2. Discussion of the Background

Path-planning and object identification are implemented in autonomous vehicle driving systems. These systems can vary from parking systems such as the advanced parking guidance system (APGS) developed by Toyota Motor Corporation, which is an intelligent parking assist system, to un-structure and structured autonomous driving systems such as those discussed in U.S. application Ser. No. 12/471,079, filed May 22, 2009. These systems describe aspects of using sensors, including vision and laser based sensors, to identify locations of obstacles and build maps of navigable space. With respect to parking a controlled vehicle, a parking spot is chosen and a path-planner is invoked to actuate the vehicle to arrive at the desired destination.

SUMMARY

This disclosure identifies and addresses problems in these arts associated with identifying and choosing destinations for the vehicle that result in safer trajectories while increasing the chance of completing a maneuver without restarting. Although disclosure relates to intelligent parking assist systems for vehicle behavior, it should be appreciated other driver-assist systems or fully autonomous systems will also benefit from the features described herein.

The parking technologies noted above may fail, resulting in a stopping of the actuation of the vehicle control (known as a "restart") due to one of several factors. First, vehicle sensors may be inaccurate. Specifically, maps which are constructed and are initially deemed feasible may actually contain occluded obstacles that only become visible/sensed during a vehicle trajectory or parking maneuver resulting in a restart. Second, vehicle position may be inaccurate. In particular, the physical model of the vehicle's motion can introduce errors in constructed maps. Local measurements made by a sensor previously in time may not correspond to the true distance to the obstacle due to inaccuracies in estimation of self-motion. This problem can also lead to restarts. Further, a vehicle's position may also be inaccurate in global coordinates, thus causing errors in global maps, such as global positioning system (GPS) maps. One such problem is due to GPS drift conditions, which may cause a goal to be infeasible and/or occupied. For example, a goal may appear to have "shifted" by a distance comparable to the size of the vehicle.

The optimizations described herein include a process which chooses a "best" destination subject to many constraints, which is described as an optimal destination. The optimization process chooses a location with sophisticated estimation of danger from local obstacles, proximity to original desired location, and a local alignment of structures. These considerations increase the chance of completing a trajectory of a vehicle safely without requiring a restart.

In accordance therewith, one aspect of this disclosure relates to a method of optimizing a destination for a vehicle. The method includes obtaining a map corresponding to a desired destination of the vehicle, and identifying objectives of the map based on multiple parameters including collision avoidance, driver time, legal constraints and social consensus. Next, a cost function is constructed to determine an optimal destination based on a proximity to the desired destination and the identified objectives. Then, the optimal destination is identified by minimizing a value of the cost function.

In a further aspect, the method includes updating the map with updated data from multiple sensors while the vehicle approaches the optimal destination. As a result of the updated map information, the identified objectives and the cost function are also updated. Then, a new optimal destination can be identified based on the updated cost function.

An additional aspect of this disclosure includes discarding the previously identified optimal destination and selecting the newly identified optimal destination as the vehicle's destination in response to determining the previously identified optimal destination fails to satisfy one of the identified objectives according to the updated map. Further, in response to determining the previously identified optimal destination as satisfying the identified objectives according to the updated map, and in response to determining the newly identified optimal destination as being less than a predetermined distance away from the previously identified optimal destination, the newly identified optimal destination is discarded and the previously identified optimal destination is selected as the vehicle's destination to reduce a number of restarts associated with changing the vehicle's destination.

In certain aspects, the map is updated by sensors mounted to the vehicle. Various sensors can be used with the vehicle, including sonar, lidar, radar and camera.

In additional aspects, the legal constraints parameter includes parking restrictions, including an allowable distance of a wheel of a vehicle to a curb and an allowable distance of a vehicle from a fire hydrant or a crosswalk. Additionally, the social consensus parameter include social parameters, which reflect a social consensus for parking. For example, these parameters can include consistent vehicle alignment between adjacent vehicles in a parking lot, consistent vehicle alignment with respect to a curb and spacing between parallel or adjacent vehicles, and whether the vehicles are parked parallel or adjacent in a parking lot.

In a preferred aspect, the cost function is minimized by employing branch and bound search techniques and conjugate gradient optimization to limit the computation time required for determining an optimal destination. Accordingly, processing time can be reduced and new optimal destinations can be considered many times a second.

Other aspects of the disclosure include a storage medium including executable instructions to perform a method of optimizing a destination for a vehicle, and further a system including a processor to optimize a destination for a vehicle.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
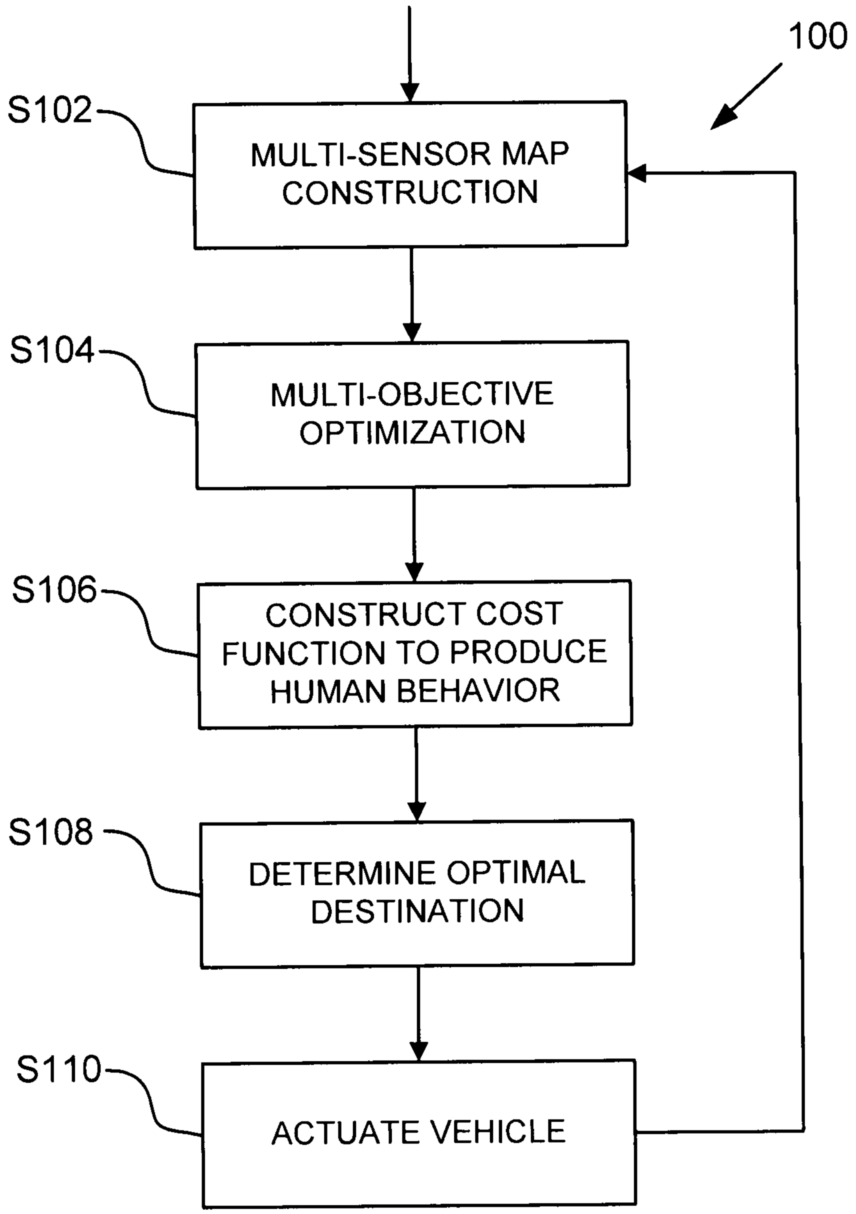
FIG. 1 is an algorithm for determining and actuating a parking procedure.

Referring now to the drawings, wherein like reference numerals designate identical or corresponding parts/steps throughout the several views, the optimization algorithm described herein operates by identifying a best position and orientation for a vehicle, conditioned on all known world information. Certain possible positions and orientations violate known constraints. For example, it is not possible to park in the same spot as another vehicle. However, even when a position/orientation pairing does not produce a collision, certain configurations can still be bad.

For example, in a parking situation, vehicles should be evenly spaced between neighboring vehicles, and vehicles should also be locally aligned (pointing in the same general direction) as nearby vehicles or locally parallel with the sidewalk. Frequently, there are many configurations which satisfy the known constraints.

In parallel parking, it may be equally acceptable to park three meters ahead or three meters behind a position relative to another vehicle, just so long as both positions are parallel to the sidewalk. In such a situation, the "best" option may be the destination that is easiest to arrive at (e.g., the closest).

Accordingly, the algorithm and processes described herein combine elements of safety (collision avoidance), wheel constraints (e.g., parking close to a sidewalk), social consensus (e.g., parking parallel to nearby vehicles), and driver time (e.g., choosing a closest destination) into a single optimization problem that may be solved to determine the best or optimal destination for the vehicle. As the vehicle approaches a desired destination, sensors mounted to the vehicle accumulate information and update local maps. As a result, a cost function is constructed and updated, which is capable of evaluating the inherent optimality of parking in a particular position/orientation which is proximate to the desired destination.

The parameters of this cost function include trade-offs for items such as proximity to original destination and following legal/social regulations. In general, it is challenging to find the best inputs to cost function with many parameters. However, this mathematical problem should be solved very quickly, as the vehicle is usually in motion during the execution of this algorithm, and a quick solution results in the timely operation and actuation of the vehicle to an optimal destination. Consequently, a preferred implementation of this disclosure uses a combination of branch-and-bound direct search techniques with a conjugate-gradient optimization to define a configuration of position and orientation results in a lowest cost to the vehicle, with respect to a cost function.

In accordance with the above, a primary objective of this disclosure is to provide intelligent combination of (1) a multi-sensor map construction process, (2) a multi-objective optimization process to choose goals that maximize safety and minimize a distance to an intended destination, and (3) uses a cost function that produces behavior similar to a human's choices (i.e., in accordance with legal and social constraints). A general algorithm for achieving this objective is shown in FIG. 1.

FIG. 1 shows an algorithm 100, which initially includes a step of constructing a multi-sensor map (S102). Then, multi-objective optimization is performed at S104, and a cost function to produce human behavior is constructed at S106. Then, at S108 an optimal destination is determined and the vehicle is actuated to travel to the optimal destination at S110.

After the vehicle is actuated, and specifically after the vehicle begins traversing a planned-path to arrive at the optimal destination, the algorithm will return to S102 to update the map. Effectively, the algorithm will repeat to identify newly sensed objects and thus refine the multi-objective optimization and the cost function. Accordingly, the optimal destination can be revised while the vehicle is in movement.

Figure 2:
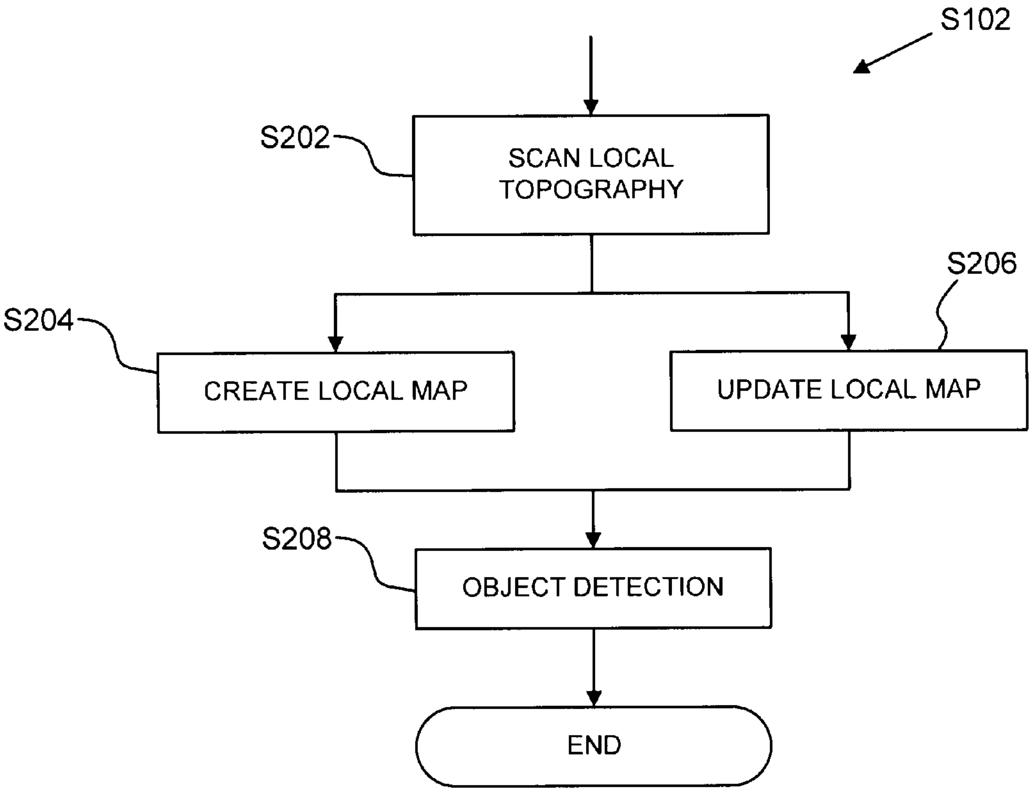
FIG. 2 is a detailed algorithm of a multi-sensor map construction step performed in the algorithm shown in FIG. 1.

Further details of the multi-sensor map construction S102 is shown in FIG. 2. Specifically, the multi-sensor map construction S102 includes an algorithm of scanning local topography with various sensors at S202, creating a local map at S204 or updating the local map at S206 if a local map had already been created, and detecting objects in the local map at S208. Steps S204 and S206 are interchangeable depending on the state of the local map, and specifically at which stage of repetition the algorithm has entered. However, it should be appreciated that a new local map can be constructed at every repetition without detracting from the scope of this disclosure.

Figure 3:
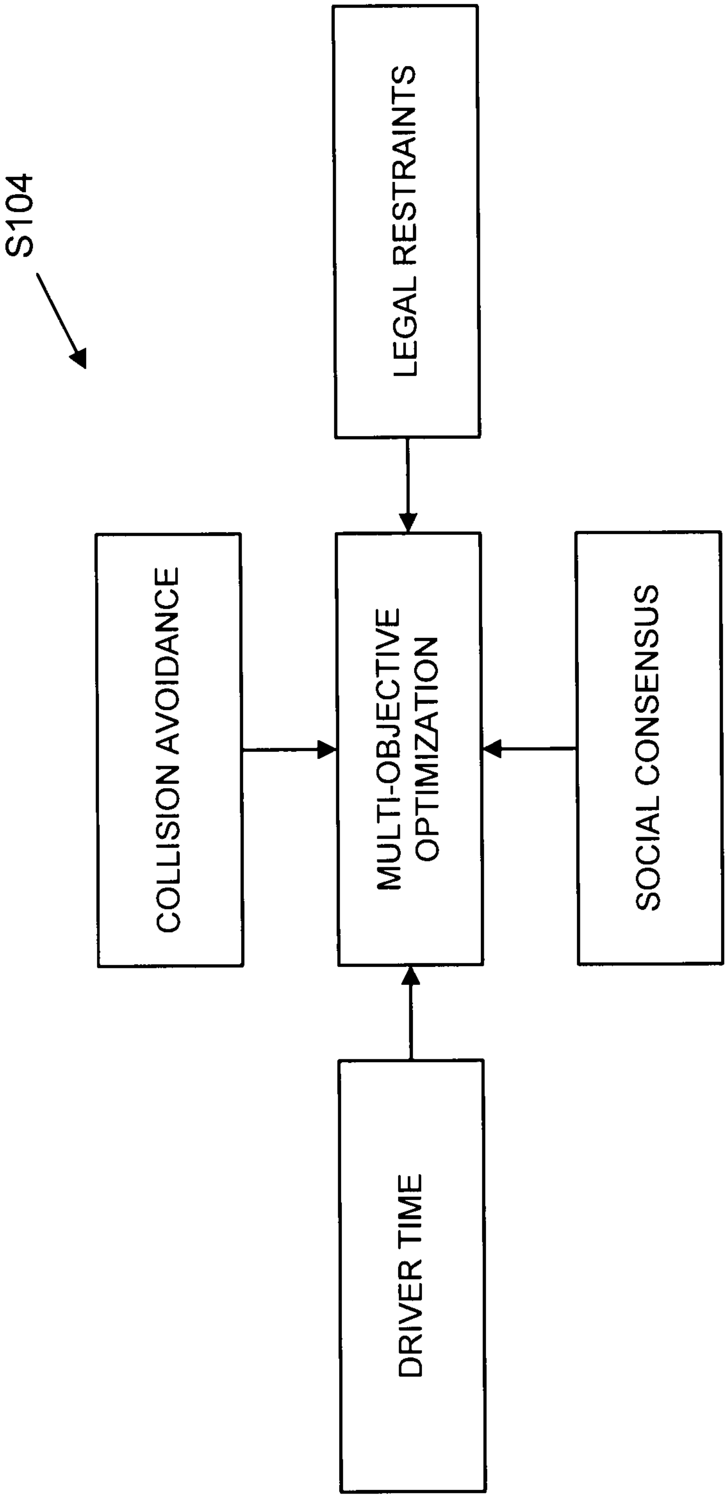
FIG. 3 is a detailed algorithm of a multi-objective optimization step performed in the algorithm shown in FIG. 1.

Further details of the multi-objective optimization S104 are shown in FIG. 3. In particular, FIG. 3 shows the multi-objective optimization as a combination of collision avoidance, driver time, legal constraints and social consensus. Driver time includes both the amount of time to complete a path trajectory to a destination as well as a distance traveled. Collision avoidance includes aspects of object detection and avoidance, including a threshold allowable distance between the vehicle and objects which the vehicle is avoiding.

The legal constraints parameter includes a variety of configurable variables, including an allowable parking distance from a curb and an allowable parking distance from a fire hydrant or a crosswalk. However, it should be appreciated that the scope of this disclosure should not be limited to merely these legal constraints.

The social consensus parameter is a parameter to further the optimization algorithm to mimic human behavior. In particular, the social consensus parameter takes into consideration the orientation of the vehicle with respect to other vehicles which are proximate to the controlled vehicle. Specifically, the social consensus parameter takes into consideration local vehicle alignments, including maintaining a common distance between vehicles in a parking lot and maintaining an appropriate distance in front of or behind other vehicles when parallel parking. However, it should be appreciated that other social consensus or social norms with parking can be configured into the cost function without detracting from the scope of the disclosure.

An exemplary cost function to obtain the above affects is shown below:

$$\text{COST} = w_{L1} \times \delta(xy_1)^2 + w_{L2} \times \delta(xy_2)^2 + w_{vsg} \times \sum_{p \in map \cap goal} \frac{1}{1 + e^{d(p)-4}}.$$

This cost function uses weights L1 and L2 to determine how close the vehicle should be to the original desired location, whereas the weight vsg is an additive non-linear cost to the closest obstacle. In this cost function, the first two terms function to keep the vehicle close to the original desired location, whereas the final term functions to move the vehicle away from obstacles.

In particular, this cost function has a minimum when (1) the front axle coordinate ($xy_1$) is close to the original desired location corresponding to the front axle, (2) the rear axle coordinate ($xy_2$) is near the original desired location corresponding to the rear axle, and (3) there is maximum distance from close map-based obstacles. The last term, in particular, can be viewed as an integral of some cost function, but is a summation due to being approximated in discrete space. In this term, “p” can be viewed as a discrete cell with distance d(p) to an obstacle such that “p” is underneath the vehicle when the vehicle is parked. The distance d(p) to the closest obstacle can be calculated using an efficient algorithm called the Voronoi Segmentation algorithm, which we use to construct a Voronoi Segmentation Grid, which is essentially a 2D grid of distances to closest obstacles.

An example of how this cost function operates results in points on a map which are close to obstacles having relatively small d(p) values, whereas points on the map which are further from the obstacles have relatively larger d(p) values. Consequently, in this embodiment, the exponential nature of this term in the cost function will have a minimum when d(p) values are relatively larger.

It should be appreciated that other cost functions are possible. For example, one which respects local alignment of match features such as vehicle orientation should be similar to orientation of sidewalk. Further, as noted above, it is preferable that this cost function is optimized using a combination of branch-and-bound (BnB) search techniques and conjugate gradient (CG) optimization.

The BnB searches over discrete intervals for an acceptable region of parameter settings using previous best results to constrain the search time. The CG method uses the best BnB results to further optimize in continuous coordinates. This method results in being relatively fast, which is important in order to compensate for a poor sensor configuration thus allowing for frequent reconstructions of maps and the determinations of new decisions about path planning and optimal destination determining. The entire process can be performed, using standard equipment, within 100 milliseconds, allowing for the re-optimization of decisions with each planning cycle.

The algorithm can also provide for comparisons with prior best solutions. Therefore, if a best solution or optimal destination is only marginally better than a prior determined optimal destination, then a goal and path will not be changed in order to prevent restarts. In other words, a prior and already initiated optimal destination will be maintained should a newly determined optimal destination not vary by a significant amount.

The above-noted processes and electronically driven systems can be implemented via a discrete control device provided in the vehicle, or can be implemented by a central processing device of the vehicle, such as a vehicle electronic control unit (ECU). In preferred aspects, the functionality described herein is provided via a processing system which is supplemental or complementary to the ECU. However, this preference should not be considered as limiting, especially in view of automated driving systems, where the processing system described below can be combined functionally and/or structurally with an automated driving or parking system which actuates the steering and throttle/brake controls of the vehicle to actuate performance of the determined path of travel.

Figure 4:
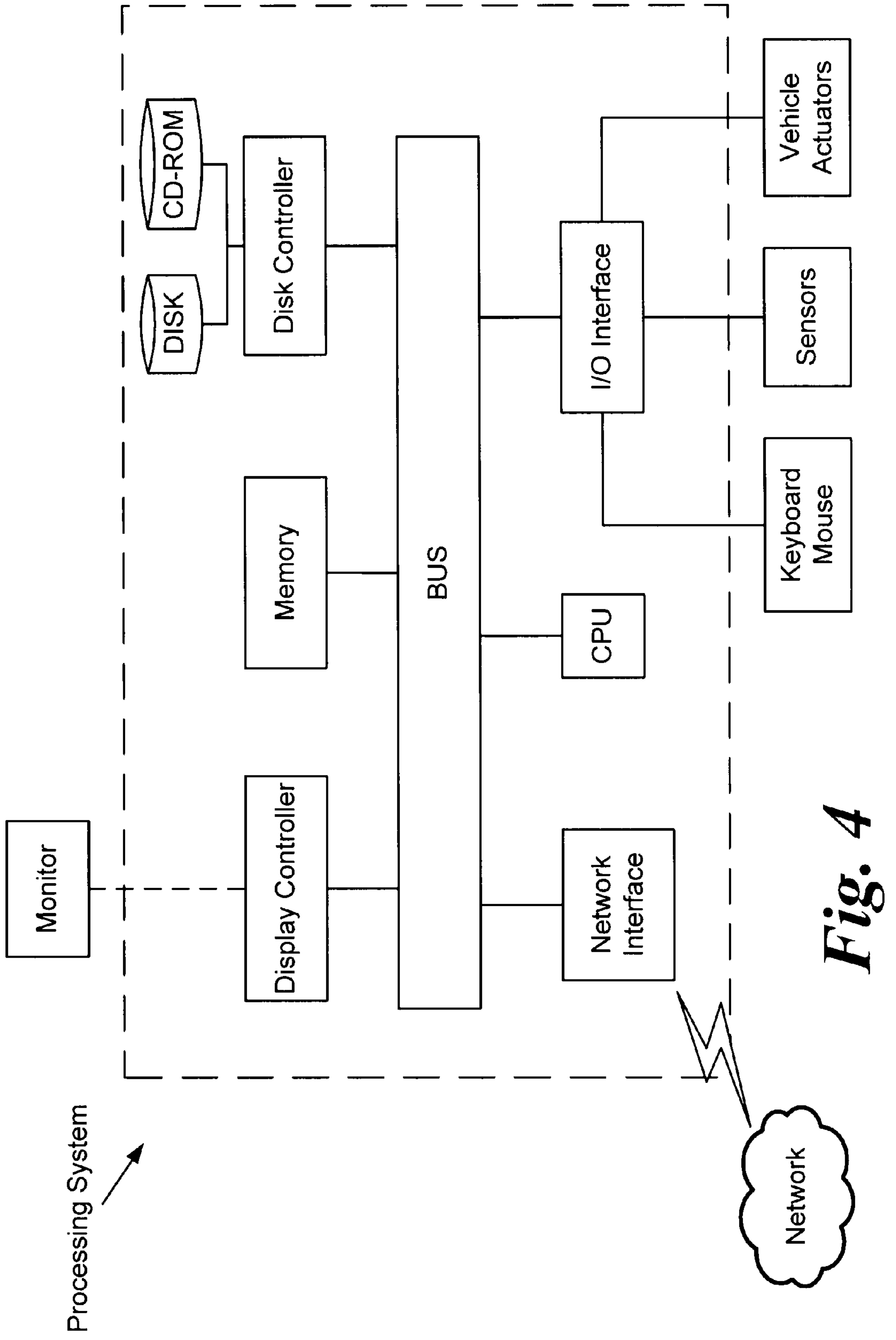
FIG. 4 is a block diagram of a processing system to execute the algorithm shown in FIG. 1.

As shown in FIG. 4, and introduced above, a processing system in accordance with this disclosure can be implemented using a microprocessor or its equivalent, such as a central processing unit CPU or at least one application specific processor ASP (not shown). The microprocessor utilizes a computer readable storage medium, such as a memory (e.g., ROM, EPROM, EEPROM, flash memory, static memory, DRAM, SDRAM, and their equivalents), configured to control (in particular, programmed to control) the microprocessor to perform and/or control the processes and systems of this disclosure. Other storage mediums can be controlled via a controller, such as a disk controller, which can controls a hard disk drive or a CD-ROM drive. In one aspect, the hard disk drive can be replaced with a high-speed flash memory storage drive, or a similar device, and further include mapping data, including global positioning system (GPS) mapping data.

The microprocessor, in an alternate embodiment, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit form parallel processing capabilities of a multi-cored CPU.

In another aspect, results of processing in accordance with this disclosure can be displayed via a display controller to a monitor, as shown in FIG. 4. The display controller would then preferably include at least one graphic processing unit for improved computational efficiency and can show images to a driver similar to those shown in FIGS. 5 and 6, which are discussed in detail below.

Additionally, an input/output interface is provided for connecting various sensors to the processing system and vehicle actuators (including steering, throttle and brake systems of the vehicle). These systems can include traditional mechanical control systems with electronic actuators or hydraulic actuators for varying a mechanical steering control, throttle and brake. However, electronic drive-by-wire systems are preferred to incorporate the functionality of other electronically driven systems such as an electronic stability control (ESC) and automated driving systems such as other parking assist systems, lane assist systems and adaptive cruise control systems.

Further, as to other input devices, the same can be connected to the input/output interface. For example, a keyboard or a pointing device (not shown) for controlling parameters of the various processes and algorithms of this disclosure can be connected to the input/output interface to provide additional functionality and configuration options, including the selection of an improved path. Moreover, the monitor can be provided with a touch-sensitive interface to route commands to the processing system. In a preferred aspect, the system accepts inputs to vary parameters associated with the social and legal constraints, so that distances to/from another vehicle, local alignment, and distances to/from legal obstacles can be varied by a driver prior to the system processing an optimal destination.

As discussed above, the sensors connected to the processing system can include radar, lidar, camera (including infrared) and GPS. However, this list should not be considered as limiting as various other sensors are adaptable to be implemented with various aspects of this disclosure.

Additionally, the above noted components can be coupled to a network, such as the Internet or a local intranet, via a network interface for the transmission or reception of data, including the controllable parameters disclosed herein. Such a data transfer can be performed at a vehicle repair facility for diagnostic purposes. However, such a data transfer can also be performed at a home location via a wireless network to allow a driver to adjust the parameters via a personal computer (not shown). An exemplary wireless network can include a network compliant with IEEE 802, preferably IEEE 802.11 (Wi-Fi and WLAN), IEEE 802.15.1 (Bluetooth) and/or IEEE 802.3 (Ethernet). Lastly, a central BUS is provided to connect the above-noted components together and provides at least one path for digital communication there between.

Figure 5:
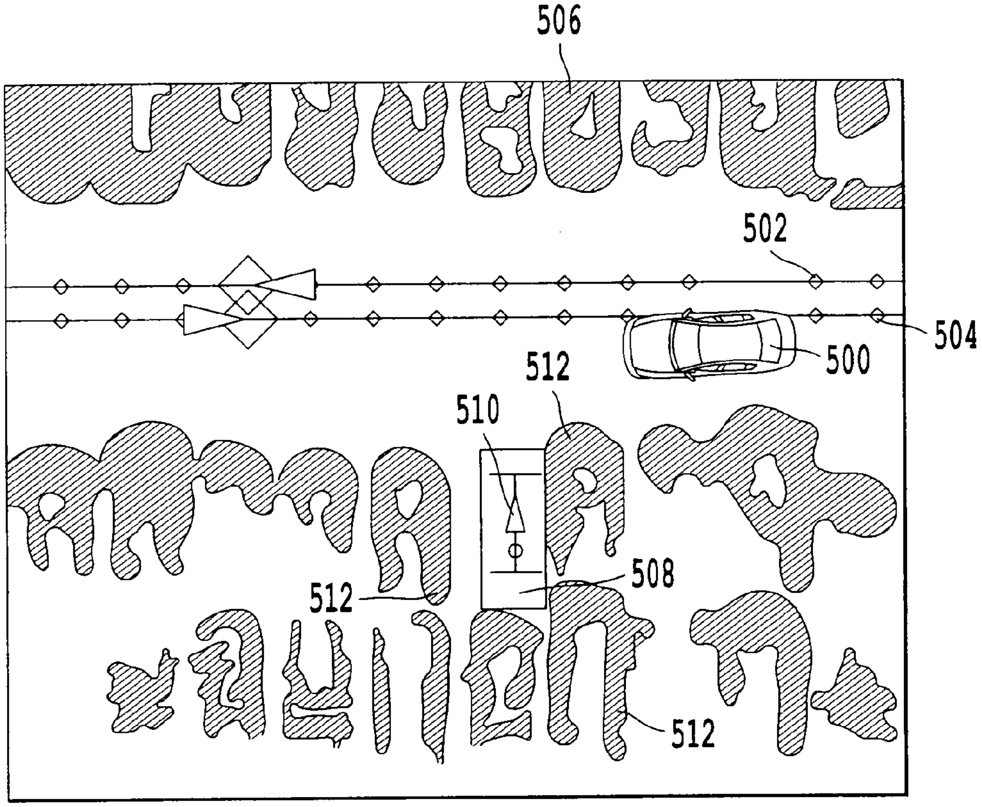
FIG. 5 shows a vehicle destination and path.
Figure 6:
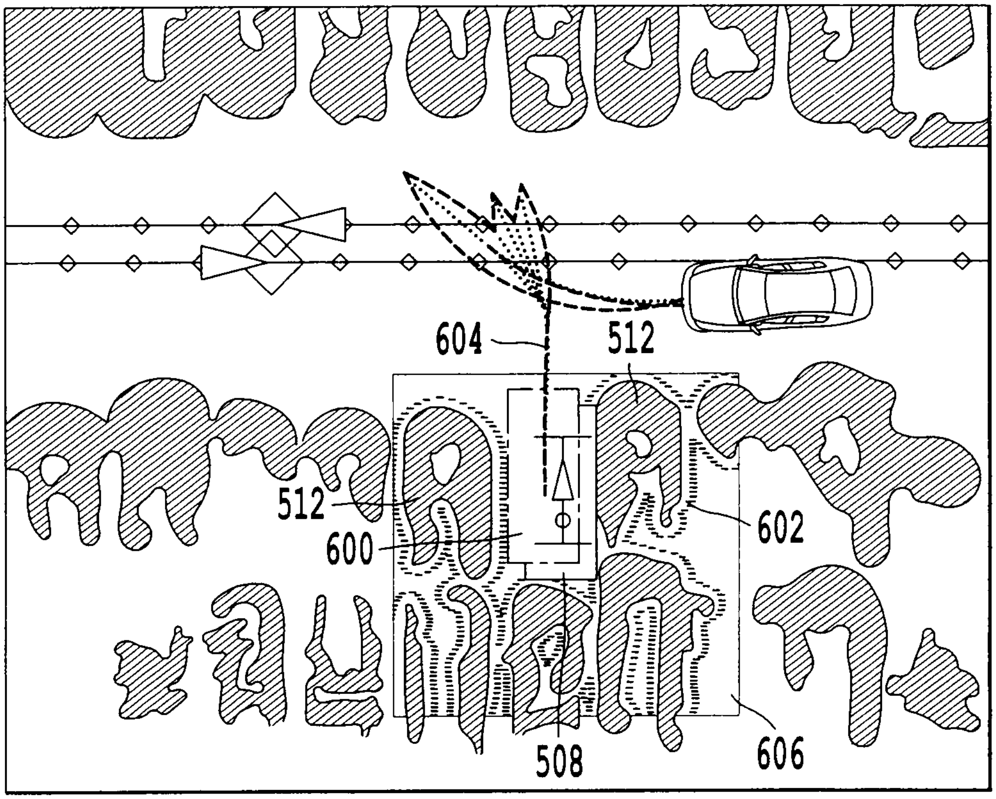
FIG. 6 shows an updated vehicle destination and path.

FIGS. 5 and 6 illustrate an example of an aspect of the above-described algorithm and process. FIG. 5 shows a vehicle 500 in a parking lot having paths of travel 502 and 504. Sensors of the vehicle 500 (not shown) detect obstacles which are shown by the shaded region 506. Further, a desired destination 508 is shown with a vehicle orientation identified by the arrow 510. Upon approaching the desired destination 508, the vehicle is able to determine the desired destination is not optimal. In particular, the desired destination intersects with detected obstacles 512.

FIG. 6 illustrates an application of the above-described algorithm and process where the desired destination 508 is shifted to the optimal destination 600. In particular, by employing a cost function as disclosed herein, the obstacles 512, as well as other adjacent obstacles, are weighted to comply with a social consensus of maintaining a distance between vehicles, thus creating a buffer 602 surrounding the obstacles 512.

Consequently, the optimal destination 600 is determined and a path 604 of the vehicle can be computed to result in proper alignment and parking of the vehicle. To improve efficiency of the system, the system may further include limiting the area in which the cost function is applied to an area which is proximate to the desired destination. Specifically, a box 606 can be created which restricts the computation of requirements of the algorithm to a fixed distance around the desired destination. Consequently, in this aspect of the disclosure, optimization is performed only within the box 606, thus creating a processing zone, which is a dimensional limit on processing. Although the box 606 is shown as a square, it is should be appreciated other dimensional shapes can be chosen. In particular, a dimensional shape can be chosen based on a dimensional shape of the desired destination. As a result, rectangular and curved shapes (e.g. circles) can be chosen.

Any processes, descriptions or blocks in flow charts or functional block diagrams should be understood as representing modules, segments, portions of code which include one or more executable instructions for implementing specific logical functions or steps in the processes/algorithms described herein, and alternate implementations are included within the scope of the exemplary embodiments of this disclosure may be executed out of order from that shown or discussed, including substantially concurrently or in reverse order, depending upon the functionality involved, as would be understood by those skilled in the art.

Moreover, as will be recognized by a person skilled in the art with access to the teachings of this disclosure, several combinations and modifications of the aspects of this disclosure can be envisaged without leaving the scope of thereof. Thus, numerous modifications and variations of this disclosure are possible in light of the above teachings, and it is therefore to be understood that within the scope of the appended claims, this disclosure may be practiced otherwise than as specifically described herein.

The invention claimed is:

1. A method of optimizing a destination for a vehicle, comprising:

obtaining a map corresponding to a desired destination of the vehicle;

identifying objectives of the map based on multiple parameters including collision avoidance, driver time, legal constraints and social consensus;

constructing a cost function to determine an optimal destination based on a proximity to the desired destination and the identified objectives; and identifying the optimal destination of the vehicle by minimizing a value of the cost function.

2. The method according to claim 1, further comprising:

updating the map with updated data from multiple sensors while the vehicle approaches the optimal destination;

updating the identified objectives and the cost function based on the updated map; and identifying a new optimal destination based on the updated cost function.

3. The method according to claim 2, further comprising:

discarding the previously identified optimal destination and selecting the newly identified optimal destination as the vehicle's destination in response to determining the previously identified optimal destination fails to satisfy one of the identified objectives according to the updated map; and in response to determining the previously identified optimal destination satisfies the identified objectives according to the updated map and in response to determining the newly identified optimal destination is less than a predetermined distance away from the previously identified optimal destination, discarding the newly identified optimal destination and selecting the previously identified optimal destination as the vehicle's destination to reduce a number of restarts associated with changing the vehicle's destination.

4. The method according to claim 2, wherein the map is updated by sensors mounted to the vehicle.

5. The method according to claim 1, wherein processing for the cost function is restricted to a processing zone encompassing the desired destination and an area surrounding the desired destination having fixed dimensions.

6. The method according to claim 5, wherein the fixed dimensions are adjustable through a user-interface for a controller of the vehicle.

7. The method according to claim 1, wherein the legal constraints parameter includes parking restrictions including an allowable distance of a wheel of a vehicle to a curb and an allowable distance of a vehicle from a fire hydrant or a crosswalk.

8. The method according to claim 7, wherein the distances associated with the legal constraints are adjustable through a user-interface for a controller of the vehicle.

9. The method according to claim 1, wherein the social consensus parameter includes social parking parameters including at least one of consistent vehicle alignment, vehicle alignment with respect to a curb, and spacing between parallel or adjacent vehicles.

10. The method according to claim 9, wherein the spacing and alignment parameters associated with the social consensus parameter constraints are adjustable through a user-interface for a controller of the vehicle.

11. The method according to claim 1, further comprising:

minimizing the value of the cost function by employing branch-and-bound search techniques and conjugate gradient optimization.

12. The method according to claim 1, further comprising: constructing the map from data from multiple sensors, the sensors including at least two of lidar, camera, radar and infrared.

13. A storage medium including executable instructions, that when executed by a processor performs a method of optimizing a destination for a vehicle, the method comprising:

obtaining a map corresponding to a desired destination of the vehicle;

identifying objectives of the map based on multiple parameters including collision avoidance, driver time, legal constraints and social consensus;

constructing a cost function to determine an optimal destination based on a proximity to the desired destination and the identified objectives; and identifying the optimal destination of the vehicle by minimizing a value of the cost function.

14. The storage medium according to claim 13, the method further comprising:

updating the map with updated data from multiple sensors while the vehicle approaches the optimal destination;

updating the cost function based on the updated map; and identifying a new optimal destination based on the updated cost function.

15. The storage medium according to claim 14, the method further comprising:

discarding the previously identified optimal destination and selecting the newly identified optimal destination as the vehicle's destination in response to determining the previously identified optimal destination fails to satisfy one of the identified objectives according to the updated map; and in response to determining the previously identified optimal destination satisfies the identified objectives according to the updated map and in response to determining the newly identified optimal destination is less than a predetermined distance away from the previously identified optimal destination, discarding the newly identified optimal destination and selecting the previously identified optimal destination as the vehicle's destination to reduce a number of restarts associated with changing the vehicle's destination.

16. The storage medium according to claim 13, wherein processing for the cost function is restricted to a processing zone encompassing the desired destination and an area surrounding the desired destination having fixed dimensions.

17. A system including a processor to optimize a destination for a vehicle, the system comprising:

a map module configured to obtain a map corresponding to a desired destination of the vehicle;

an identification module configured to identify objectives of the map based on multiple parameters including collision avoidance, driver time, legal constraints and social consensus;

a cost function module configured to construct a cost function to determine an optimal destination based on a proximity to the desired destination and the identified objectives; and a destination module configured to identify the optimal destination of the vehicle by minimizing a value of the cost function.

18. The system according to claim 17, wherein:

the map module updates the map with updated data from multiple sensors while the vehicle approaches the optimal destination;

the cost function module updates the cost function based on the updated map; and the destination module identifies a new optimal destination based on the updated cost function.

19. The system according to claim 18, wherein:

the destination module discards the previously identified optimal destination and selects the newly identified optimal destination as the vehicle's destination in response to determining the previously identified optimal destination fails to satisfy one of the identified objectives according to the updated map; and in response to determining the previously identified optimal destination satisfies the identified objectives according to the updated map and in response to determining the newly identified optimal destination is less than a predetermined distance away from the previously identified optimal destination, the destination module discards the newly identified optimal destination and selects the previously identified optimal destination as the vehicle's destination to reduce a number of restarts associated with changing the vehicle's destination.

20. The system according to claim 17, wherein processing for the cost function is restricted to a processing zone encompassing the desired destination and an area surrounding the desired destination having fixed dimensions.

* * * * *